United States Patent [19]

McGlade

[11] Patent Number: 4,806,760
[45] Date of Patent: Feb. 21, 1989

[54] RADIATION DETECTORS HAVING MECHANICAL RESONATION

[75] Inventor: Stuart M. McGlade, Chelmsford, United Kingdom

[73] Assignee: The General Electric Company p.l.c., London, United Kingdom

[21] Appl. No.: 22,061

[22] Filed: Mar. 3, 1987

[30] Foreign Application Priority Data

Mar. 4, 1986 [GB] United Kingdom ............... 8605255

[51] Int. Cl.⁴ .................... G02F 1/01; G01N 21/00
[52] U.S. Cl. ............................. 250/330; 250/338.1; 356/432 T
[58] Field of Search ............ 250/330, 338, 342; 356/432 T

[56] References Cited

U.S. PATENT DOCUMENTS

| | | | |
|---|---|---|---|
| 4,255,971 | 3/1981 | Rosencwaig | 356/432 T |
| 4,579,463 | 4/1986 | Rosencwaig et al. | 356/432 T |
| 4,581,939 | 4/1986 | Takahashi | 356/432 T |

Primary Examiner—Janice A. Howell
Attorney, Agent, or Firm—Spencer & Frank

[57] ABSTRACT

Infra-red from a field of view is periodically interrupted before being incident on a mechanically resonant detector. Resonation of this caused by the photo-acoustic effect is detected by an optical beam.

12 Claims, 2 Drawing Sheets

RADIATION DETECTORS HAVING MECHANICAL RESONATION

FIELD OF THE INVENTION

This invention relates to a device for detecting radiation, and particularly, though not exclusively, infra-red radiation.

DESCRIPTION OF THE PRIOR ART

Present infra-red radiation detectors generally fall into two classes, those using pyro-electric materials and those using photo-conductive materials. Both of these materials have major drawbacks. Pyroelectric materials are comparatively insensitive, their sensitivities being of the order of $10^4$ times lower than that of photo-conductive materials. Photo-conductive materials must be cooled to very low temperatures in order to operate and the need for cryogenic cooling greatly increases the bulk and complexity of infra-red detector systems using photo-conductive materials. Also in systems where an infra-red image is focussed onto one side of an array of photodetectors (a so called "staring array") an output signal is derived using an electron beam to scan the reverse side of the array. It is difficult to provide a suitable support for the array of photodetectors which does not obstruct the scanning electron beam. Accordingly such staring arrays have to be largely self-supporting and since they are in general thin layers are comparatively fragile.

BRIEF SUMMARY OF THE INVENTION

The present invention was made in an attempt to overcome these problems and envisages the use of the photo-acoustic effect in order to do so. This effect is the production of vibration as a result of periodic thermal expansion and contraction of a body on which pulses of radiation are incident.

This invention provides an apparatus for inspecting a field of view comprising focussing means for producing an image of the field of view or of part of it; a radiation detector having a particular mechanical resonant frequency; means for causing the detector to be exposed periodically to the image, the frequency of the periodic exposure being such that the exposure causes mechanical resonation of the detector and means for producing a signal in response to resonation of the detector, the said signal being indicative of the presence and/or brightness of a source or reflector in the field of view.

It is believed that an apparatus can be constructed in accordance with the invention having a sensitivity to infra-red radiation comparable to conventional cryogenically cooled systems but without the need for such cooling. Because of this advantage the invention is of particular value for sensing infra-red radiation but it will be understood that it is applicable to the sensing of other wavelengths.

The radiation falling on the detector is preferably pulsed by periodic interruption of the radiation passing from features in the field of view to the detector. However an alternative possibility would be to illuminate the field of view using a pulsed source of radiation.

In some situations it may be advantageous both to pulse a source of radiation illuminating the field of view and to position an interrupter in front of the detector. Such a system will be sensitive to features at a particular range dependent on the relative phase of the source and the interrupter. The particular range can be changed by changing the relative phase.

A conventional scanning system may be used to cause a single radiation detector to scan the entire field of view. This can be done by forming an image of the entire field of view and deflecting the image so that it sweeps across the detector. Alternatively an image can be formed, on the detector, of just a single part of the field of view; and this part can be made to sweep across the field of view.

Instead of using just a single detector a plurality of radiation detectors may be used to form a so called "staring array" in which different detectors receive radiation continuously from different parts of the field of view.

A compromise between a single detector and a staring array is also possible in which a line of detectors views a swath, e.g. a horizontal swath, of the field of view; and which an optical scanning system is used to scan in the other dimension, e.g. elevation.

The signal produced in response to resonation of the detector may be an electrical signal produced by a transducer attached to it; or produced directly by the detector if the latter is itself piezoelectric. Such an electrical signal could be read out along electrical conductors or by an electron beam as in a conventional infra-red imager. Preferably however the signal is produced by an optical beam reflected off the sensor and therefore caused to vary in some way by the resonation of the sensor. This variation could be a deflection causing the reflected beam to sweep across a photodetector. Alternatively it could be a change in intensity of the beam produced on reflection off or transmission through the detector. A preferred technique however is to arrange the detector so that the movement of it during resonation produces a change in the path length of the optical beam and to use an interferometer to detect this change. Whatever method is used, the use of the optical beam to sense the movement of the detector is considered particularly advantageous with a staring array of detectors. This is because an optical beam can easily be deflected to interrogate the different detectors in turn thereby avoiding the need for a large number of individual connections to respective detectors. Also, the use of an optical beam allows a relatively strong optically transparent supporting structure to be used behind the detectors of an array to support the latter with the optical beam passing through the transparent supporting structure. If an electron beam were used this would not be possible because most substances are opaque to electrons.

If the detector is made from a transparent material, such as quartz it is convenient to construct both the detector and a supporting structure for it from a single piece of such material.

The reference in this specification to an "optical" beam is defined as including either visible, infra-red, or ultra violet radiation. The optimum wavelength may be selected to coincide with the optimum transmittivity of the quartz or other support (if provided) for the detector or detectors.

The radiation detector is preferably a balanced oscillator since this minimises interaction between the oscillator and its support and, where there is more than one detector, minimises interaction between oscillators.

The radiation detector may advantageously be coated with a layer of material chosen to assist in absorbing the radiation.

BRIEF DESCRIPTION OF THE DRAWINGS

Two ways in which the invention may be performed will now be described by way of example with reference to FIGS. 1 and 2 in which.

Identical reference numerals will be used throughout for equivalent parts.

DETAILED DESCRIPTION OF THE INVENTION

Figure 1:
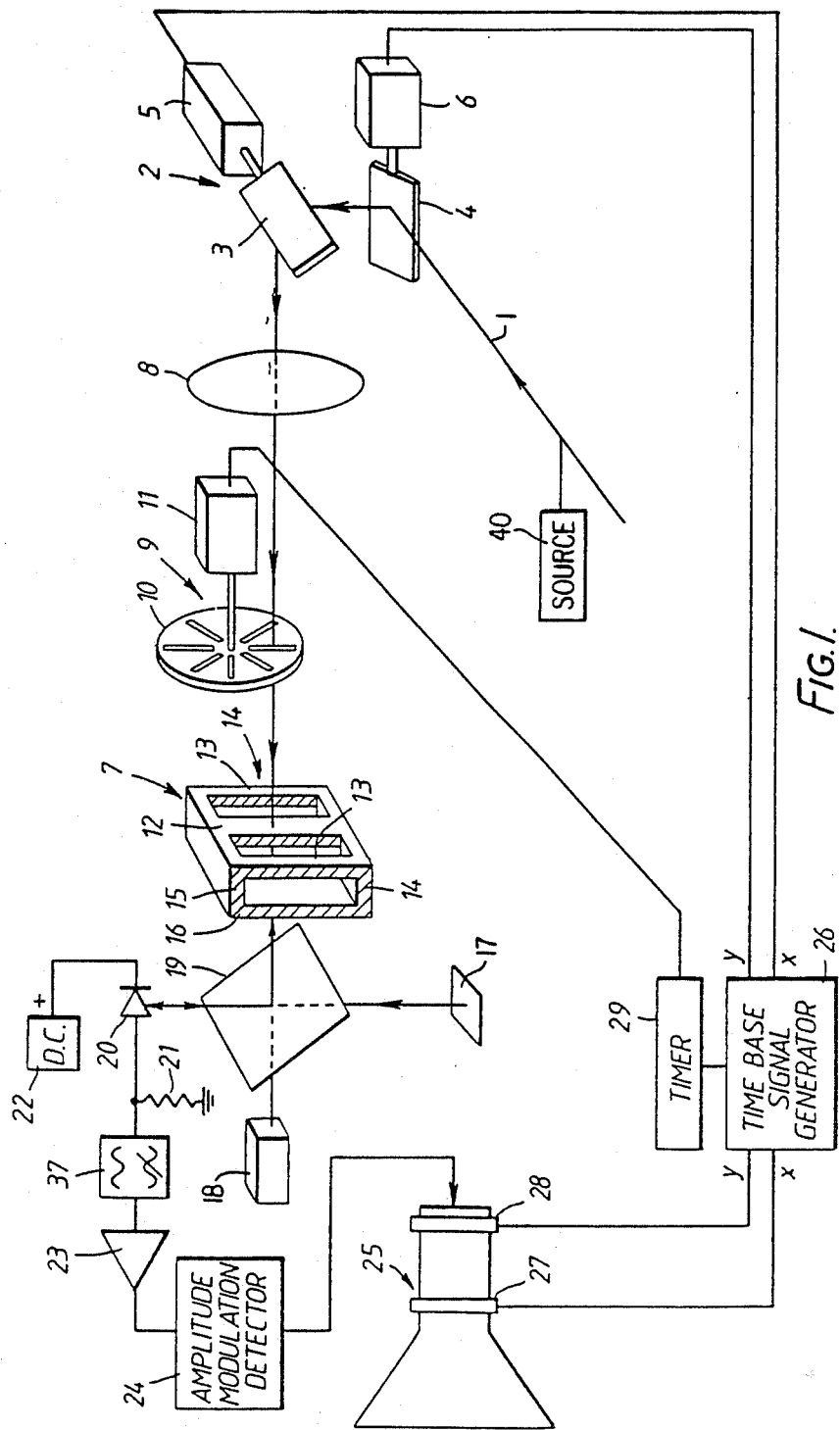
FIG. 1 shows an apparatus constructed in accordance with the invention and employing a single element scanning detector.

Referring to FIG. 1 infra-red radiation passing along a path 1 from a scene is illuminated by a source 40 of pulses of radiation and scanned by a two dimensional scanner 2 formed, in this embodiment, by a conventional pair of oscillating mirrors 3 and 4 where mirror 3 scans in the horizontal direction and mirror 4 in the vertical direction. The mirrors are moved by drives 5 and 6 respectively. The infra-red radiation is then focussed on an infra-red detecting element 7 by an infra-red focussing device constituted by a germanium lens 8 (not shown to scale). The infra-red radiation from the lens 8 is modulated by the chopper 9 which is a rotating disk 10 with radial sections removed from it and driven by a motor 11. The number of such sections are selected and the rotation rate is varied to produce a modulation frequency equal to the principal resonant frequency of the infra-red detecting element 7.

The infra-red detecting element 7 includes a central resonant beam 12 and two outer, parallel compensating beams 13. The ends of these beams are spaced by end walls 14, 15 from a rear supporting wall 16. The three beams define a triple-beam balanced oscillator in which the outer beams 13 and central beam 12 are 180° out of phase. This minimises the amount of vibration lost by transmission to the wall 16 and resulting sensitivity loss. The face of the central beam 12 nearest the wall 16 is coated in gold, in order to allow easy optical reading of its position. The components 12,13,14,15 and 16 are constructed monolithically from quartz by etching. Quartz is used because it is transparent, allowing optical reading of the position of the beam 12 through the rear wall 16.

A time base signal generator 26 supplies X and Y deflection signals to coils 27 and 28 of the CRT 25 and similar X and Y deflection signals to the drives 5 and 6. The resulting synchronisation of the drives 5 and 6 and the XY deflection signals allows the CRT to display an image of the scene scanned.

Periodic thermal expansion and contraction of the beam 12 caused by the pulses of infra-red radiation incident on it induce the beam to vibrate, this phenomenon being known as the photo-acoustic effect. The resulting movements of the photo-acoustic element are read by an interferometer comprising a mirror 17, a laser 18 and beam splitter 19. A detector diode 20 receives light along a fixed length path from the laser 18 via the beam splitter 19 and mirror 17. It also receives light along a variable length path extending from laser 18; to beam splitter 19; through transparent wall 16; to the reflective coating on element 12; back through the wall 16 and beam splitter 19 to the diode 20. Changes in the length of the last mentioned path caused by movement of the element 12 change the interference effects of the light received by the diode 20. This causes corresponding changes in the output of the latter.

The detector diode 20 is connected in series with a load resistor 21 between a D.C. power supply 22 and earth. Thus the current through and hence voltage across the load resistor 21 is dependent on the intensity of the infra-red radiation 1.

The D.C. component of the voltage across the load resistor 21 is removed by a high-pass filter 37, and the remaining A.C. component is amplified by the amplifier 23. The amplified signal is then put through an amplitude modulation detector 24, for example a full wave rectifier and low-pass filter, which extracts the amplitude modulated signal representing the intensity of the infra-red radiation 1. This amplitude modulated signal is then used as a brightness control for a cathode ray tube 25. A timer 29 controls the speed of the motor 11 and of the time base generator.

Figure 2:
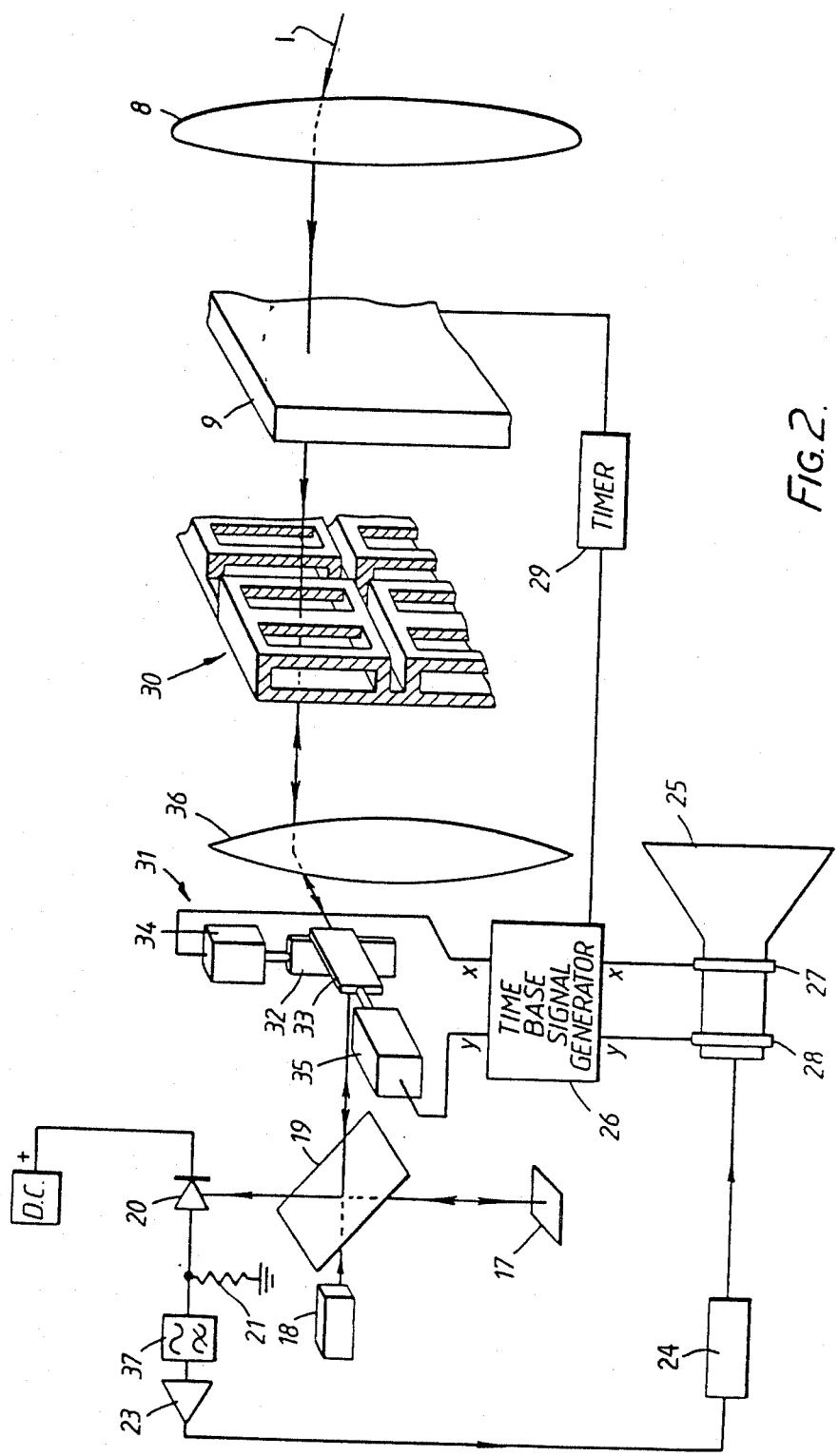
FIG. 2 shows another apparatus constructed in accordance with the invention but employing a "staring array" of detectors, shown partly broken away.

FIG. 2 shows a "staring array" system. Infra-red radiation 1 is modulated by a chopper 9 (shown schematically) and focussed by an infra-red lens 8 as before. The infra-red radiation is focussed on to a 256×256 array of infra-red detecting elements 30 formed on a quartz substrate. The movements of the elements in the array are read separately in turn using an interferometer comprising a mirror 17, a laser 18 and a beam splitter 19 as before. The interferometer functions as previously described except that the optical path to the infra-red detecting elements 30 is scanned across the array by an X-Y scanning system 31. The elements are read in turn as the optical path is swept across them by the scanning system 31. The latter comprises a pair of oscillating mirrors 32 and 33 powered by drives 34 and 35 respectively, a conventional arrangement which need not be described further. The scan lens 36 is made of glass and is shaped so as to ensure that light from the interferometer striking the array always does so perpendicularly and so ensures that the change in optical path length is equal to the amplitude of vibration of the element being read. The current through detector diode 20 is used to control the brightness of C.R.T. 25 as before.

The time base signal generator 26 synchronises the scanning of C.R.T. 25 and scanner 31 in order to produce a image of the scene looked at by the staring array.

The array of detectors 30 is made from quartz because its low thermal conductivity reduces the spread of heat from element to element in the array and so minimises sensitivity loss.

If the invention is to be used in an active system where an area is to be illuminated with infra-red radiation generated at a source the modulator can be omitted from the detector and the source modulated instead.

I claim:

1. Apparatus for inspecting a field of view comprising: focussing means for producing an image of the field of view or part of it; a radiation detector having a particular resonant frequency; means for causing the detector to be exposed periodically to the image of a frequency, the frequency of the periodic exposure being such that the exposure causes mechanical resonation of the detector; and means for producing a signal in response to resonation of the detector, said signal being indicative of the brightness of a source or reflector in the field of view.

2. Apparatus according to claim 1 including means for periodically interrupting radiation passing from features in the field of view to the detector.

3. Apparatus according to claim 1 including a source of pulses of radiation arranged to illuminate the field of view.

4. Apparatus according to claim 1 including a plurality of radiation detectors arranged such that each receives radiation from a respective small area of the field of view.

5. Apparatus according to claim 4 wherein each of said plurality of radiation detectors includes a balanced oscillator.

6. Apparatus according to claim 4 wherein each of said plurality of radiation detectors is defined by a single body of material shaped to form a vibrating beam arranged to receive the radiation, and a support for the beam.

7. Apparatus according to claim 1 wherein said means for producing the signal comprises means for directing light onto said radiation detector, means for receiving the light after reflection therefrom, and means for responding to variations in a characteristic of the reflected light caused by resonation of said radiation detector and to produce the said signal indicative of the brightness of a source or reflector in the field of view.

8. Apparatus according to claim 7 wherein said means for responding to the variations includes an optical interferometer.

9. Apparatus according to claim 1 wherein said radiation detector includes a balanced oscillator.

10. Apparatus according to claim 1 wherein said radiation detector is defined by a single body of material shaped to form a vibrating beam arranged to receive the radiation, and a support for the beam.

11. Apparatus according to claim 10 wherein said single body of material is quartz.

12. Apparatus according to claim 1 wherein said radiation detector is an infra-red detector.

* * * * *